US012739312B2

(12) United States Patent
Liu et al.

(10) Patent No.: US 12,739,312 B2
(45) Date of Patent: Sep. 15, 2026

(54) METHODS FOR EDGE CACHE REPLACEMENT BASED ON DEEP REINFORCEMENT LEARNING

(71) Applicant: CHONGQING UNIVERSITY OF POSTS AND TELECOMMUNICATIONS, Chongqing (CN)

(72) Inventors: Qian Liu, Chongqing (CN); Sihong Wang, Chongqing (CN); Qilie Liu, Chongqing (CN); Zhi Qi, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 19/324,083

(22) Filed: Sep. 9, 2025

(65) Prior Publication Data

US 2026/0012518 A1 Jan. 8, 2026

Related U.S. Application Data

(63) Continuation of application No. PCT/CN2024/079954, filed on Mar. 4, 2024.

(30) Foreign Application Priority Data

Oct. 30, 2023 (CN) ......................... 202311424653.8

(51) Int. Cl.

| | |
|---|---|
| ***H04L 67/5682*** | (2022.01) |
| ***G06N 3/092*** | (2023.01) |

(Continued)

(52) U.S. Cl.

CPC ......... *H04L 67/5682* (2022.05); *G06N 3/092* (2023.01); *G06N 7/01* (2023.01); *H04L 41/145* (2013.01); *H04L 43/0852* (2013.01)

(58) Field of Classification Search

CPC ................ H04L 67/5682; H04L 43/08; H04L 67/568; G06N 3/092

See application file for complete search history.

(56) References Cited

U.S. PATENT DOCUMENTS

| | | | | |
|---|---|---|---|---|
| 12,197,951 | B1 * | 1/2025 | Shen | G06F 9/5094 |
| 2018/0034900 | A1 * | 2/2018 | Kamiyama | H04L 67/1097 |
| 2022/0224776 | A1 | 7/2022 | Doshi et al. | |

(Continued)

FOREIGN PATENT DOCUMENTS

| | | | |
|---|---|---|---|
| CN | 113282786 | A | 8/2021 |
| CN | 114374741 | A | 4/2022 |
| CN | 114786200 | A | 7/2022 |
| CN | 114885303 | A | 8/2022 |

OTHER PUBLICATIONS

Wang et al. "Attention-Weighted Federated Deep Reinforcement Learning for Device-to-Device Assisted Heterogeneous Collaborative Edge Caching" in IEEE Journal on Selected Areas in Communications, vol. 39, No. 1, pp. 154-169, Jan. 2021 (Year: 2021).*

(Continued)

*Primary Examiner* — David R Lazaro

(74) *Attorney, Agent, or Firm* — PORUS IP LLC

(57) ABSTRACT

A method for edge cache replacement based on deep reinforcement learning is provided, including: constructing a system network model; obtaining a caching state of an MEC server in the system network model; calculating a total delay for all users to obtain cached contents based on a total delay for a single user to obtain a cached content; constructing an optimization objective function based on the total delay for all users to obtain the cached contents; formulating a (Continued)

Markov decision process according to the optimization objective function; and replacing the cached content of the MEC server using a dynamic content replacement algorithm based on deep reinforcement learning according to the Markov decision process. According to a condition of a cache space of the MEC server, the system network model can obtain a minimum average delay for users to obtain contents and find a most suitable cache replacement policy.

9 Claims, 5 Drawing Sheets

(51) Int. Cl.
*G06N 7/01* (2023.01)
*H04L 41/14* (2022.01)
*H04L 43/0852* (2022.01)

(56) References Cited

U.S. PATENT DOCUMENTS

2023/0121843 A1* 4/2023 Li .......................... G06N 3/092
711/118
2025/0165802 A1* 5/2025 Chen ................... H04W 28/086
2026/0012518 A1* 1/2026 Liu .......................... G06N 7/01

OTHER PUBLICATIONS

Somesula, M.K., Mothku, S.K. & Kotte, A. "Deep reinforcement learning mechanism for deadline-aware cache placement in device-to-device mobile edge networks". Wireless Networks 29, 569-588 (2023) Published Oct. 2022 (Year: 2022).*
International Search Report in PCT/CN2024/079954 mailed on Jul. 20, 2024, 6 pages.
Written Opinion in PCT/CN2024/079954 mailed on Jul. 20, 2024, 7 pages.

* cited by examiner

METHODS FOR EDGE CACHE REPLACEMENT BASED ON DEEP REINFORCEMENT LEARNING

CROSS REFERENCE TO RELATED APPLICATIONS

This application is a continuation of International Patent Application No. PCT/CN2024/079954, filed on Mar. 4, 2024, which claims priority to Chinese Patent Application No. 202311424653.8, filed on Oct. 30, 2023, the entire contents of each of which are incorporated herein by reference.

TECHNICAL FIELD

The present disclosure is related to the field of mobile communication technologies, and in particular relates to methods for edge cache replacement based on deep reinforcement learning.

BACKGROUND

With continuous development of wireless communication technologies, users are increasingly demanding lower content delivery latency, and retrieving contents from a remote data center may fail to meet these low-latency requirements. In response, the mobile edge computing (MEC) technology has emerged, which provides computing and caching services from network edge locations, thereby reducing network latency, improving throughput, and enhancing user experience. Therefore, research on edge caching has become a prominent topic in the field of wireless communication, with addressing limited storage space of edge nodes being a key challenge. A cache policy needs to identify and cache popular contents that most users are interested in. According to content popularity, caching popular contents on an edge cloud may reduce network link congestion and a request delay, thereby improving the user experience. A content caching technology is not only an important research topic in mobile edge computing, but also an important means to solve the users' demand for low-latency.

In MEC edge caching, cache placement policies are usually typically executed at extended intervals, making it necessary to integrate them with cache replacement policies. In a mobile communication network, user mobility leads to a dynamic change in content popularity, making the development of an efficient cache replacement method crucial. Using deep reinforcement learning to design a method for edge cache replacement may predict content popularity and cache popular contents while protecting data privacy of a client, so as to reduce the network link congestion and the request delay. Therefore, in-depth study of scenarios with dynamically changing popularity is essential for determining an effective cache replacement policy.

SUMMARY

To solve the problems existing in the prior art, the present disclosure provides a method for edge cache replacement based on deep reinforcement learning, the method comprising:

S1, constructing a system network model;

S2, obtaining a caching state of a mobile edge computing (MEC) server in the system network model, and calculating a total delay for a single user to obtain a cached content based on the caching state of the MEC server;

S3, calculating a total delay for all users to obtain cached contents based on the total delay for the single user to obtain the cached content;

S4, constructing an optimization objective function based on the total delay for all users to obtain the cached contents;

S5, formulating a Markov decision process (MDP) according to the optimization objective function; and S6, replacing the cached content of the MEC server using a dynamic content replacement algorithm based on deep reinforcement learning according to the Markov decision process.

The present disclosure includes at least following beneficial effect.

In the present disclosure, considering both latency and dynamic changes of popularity, a model is trained using deep reinforcement learning, and a cached placement content and a requested content are subjected to cache replacement, so as to achieve a minimum average delay for users to obtain contents. In the present disclosure, a user delay model is established according to a state of an MEC content cache, and by combining a transmission delay and a computational delay, a total delay for the user to obtain the content can be obtained. Then the problem is modeled as a MDP defined by a four-tuple. A system state refers to the cached placement content and the requested content, an action function refers to cache replacement, and a reward function refers to minimizing an average delay for obtaining the contents. Finally, an A3C algorithm is employed to maximize a system cumulative reward. The cache hit rate of the contents can be further improved, and the average delay for obtaining the contents can be reduced.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
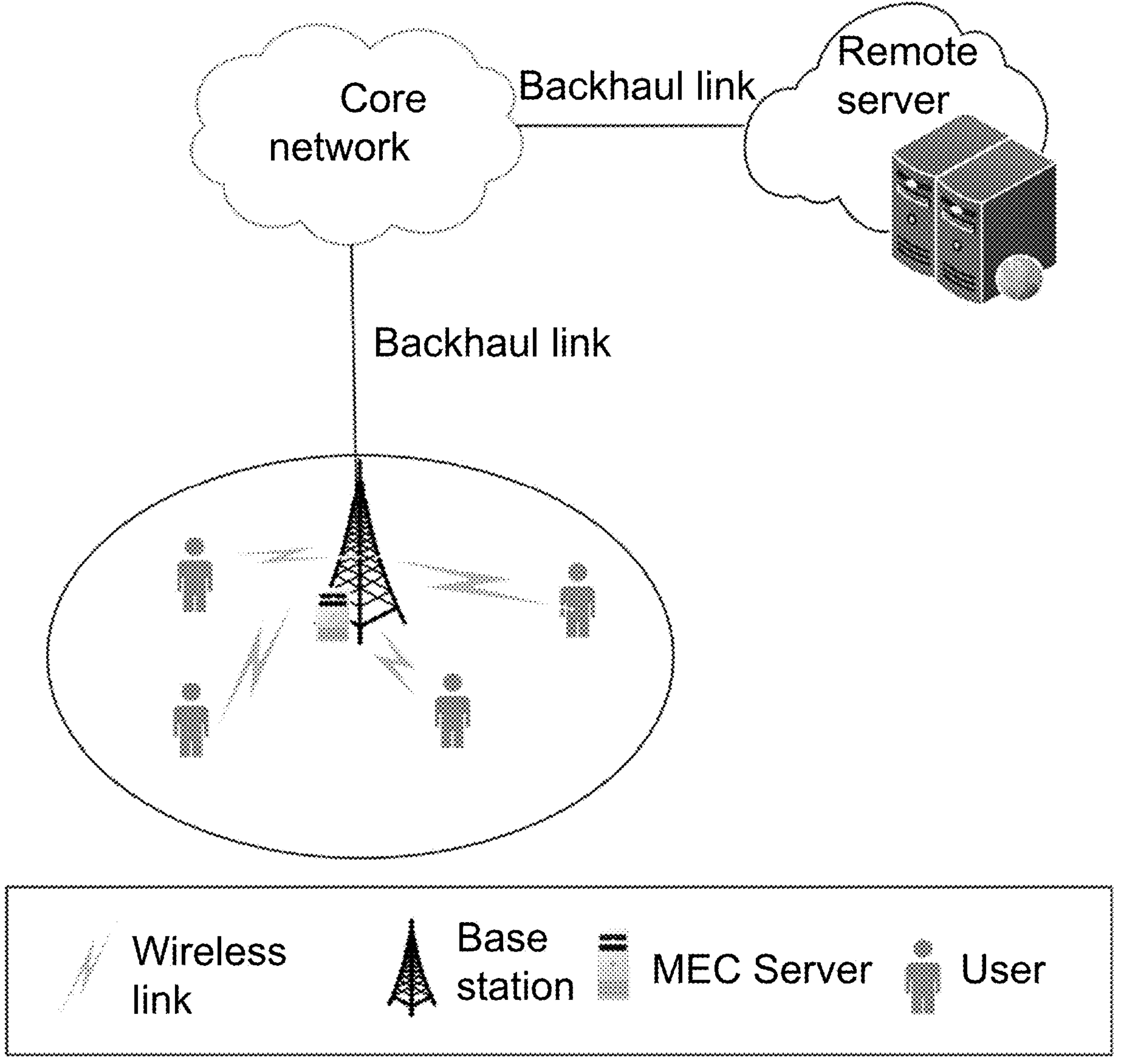
FIG. 1 is a schematic diagram illustrating a structure of a system network model according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "unit," and/or "module" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 2:
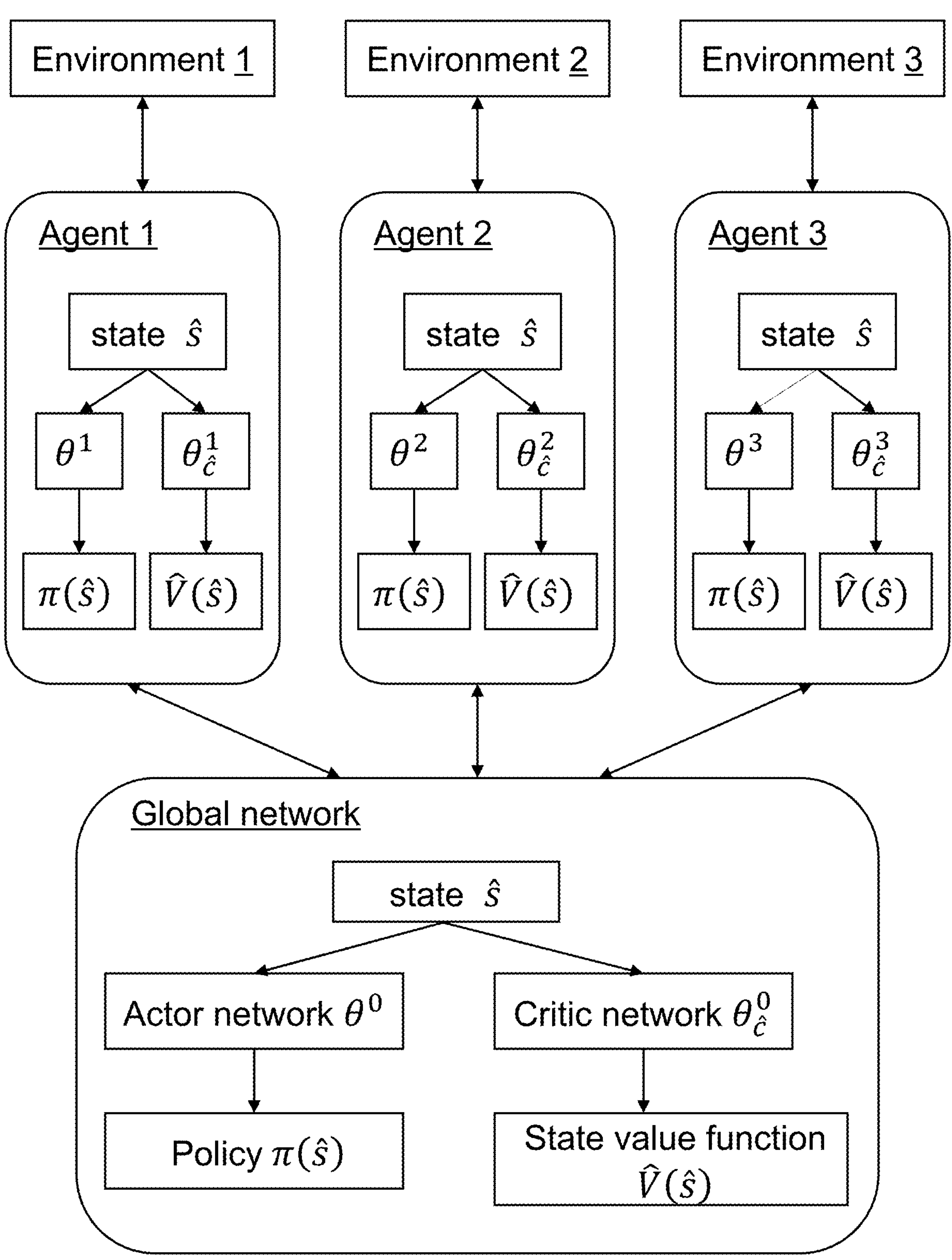
FIG. 2 is a schematic diagram illustrating a network structure of an A3C algorithm according to some embodiments of the present disclosure.
Figure 5:
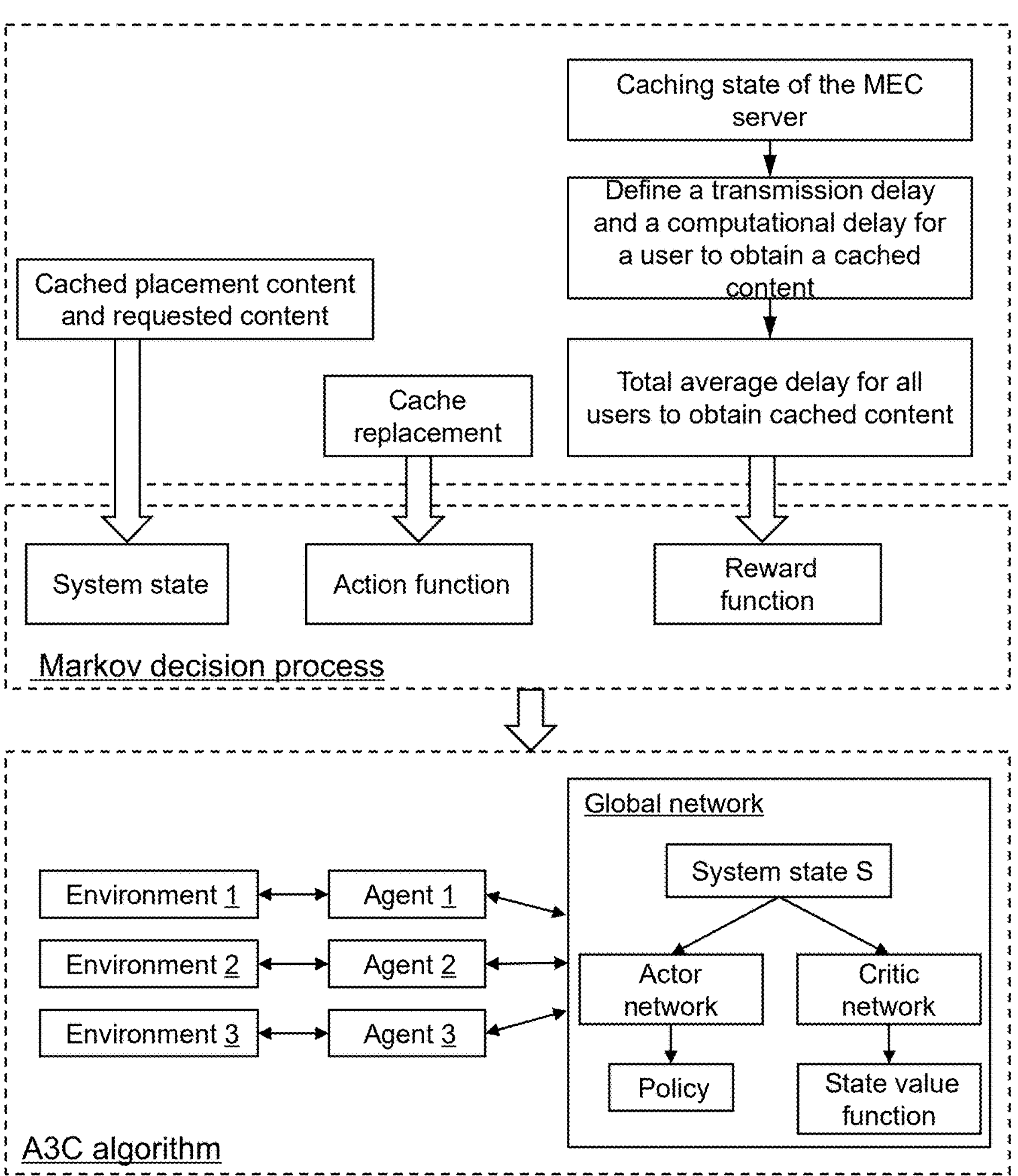
FIG. 5 is a flowchart illustrating a process for edge cache replacement based on deep reinforcement learning according to some embodiments of the present disclosure.

FIG. 1 is a schematic diagram illustrating a structure of a system network model according to some embodiments of the present disclosure. FIG. 2 is a schematic diagram illustrating a network structure of an A3C algorithm according to some embodiments of the present disclosure. FIG. 5 is a flowchart illustrating a process for edge cache replacement based on deep reinforcement learning according to some embodiments of the present disclosure. As shown in FIG. 5, the present disclosure provides the method for edge cache replacement based on deep reinforcement learning, the method including the following steps S1-S6. In some embodiments, the steps S1-S6 may be performed by a processor. The processor may include a central processing unit (CPU), an application specific integrated circuit (ASIC), an application specific instruction set processor (ASIP), a graphics processing unit (GPU), a physics processing unit (PPU), a digital signal processor (DSP), a controller, a microcontroller unit, a reduced instruction set computer (RISC), a microcontroller, or any combination thereof.

S1, constructing the system network model.

The system network model refers to a mobile communication network architecture for edge cache replacement. In some embodiments, as shown in FIG. 1, the system network model includes: a core network, a base station, an edge server (also referred to as an MEC server), a remote server, and a user.

The core network refers to a central architecture of a mobile communication network for data routing and so on. The base station may be connected to a user. In some embodiments, the base station is configured to send a content request to the edge server or the core network.

The edge server (MEC server) is a computing and storage unit deployed at a network edge. In some embodiments, the edge server is configured to cache a requested content.

The remote server is an original data storage node of a content provider or a network operator. In some embodiments, the remote server is configured to store the requested content. Therefore, in some embodiments, the remote server may also be referred to as a content server.

In some embodiments, the base station, the core network, and the remote server may be sequentially connected through a backhaul link, and the base station may be connected to the user through a wireless link. For more descriptions of the content request and the requested content, see relevant content below.

In some embodiments, constructing the system network model includes: according to characteristics of MEC, obtaining a storage capacity $Cap_{MEC}$ of the MEC server and a caching state $st_f$ of a cached content in the MEC server; defining a set of all users as $$\text{User} = \{1, 2, \ldots, Q\},$$

where Q denotes a total count of the users, defining a set of all content files as $$\text{File} = \{1, 2, , \ldots, F\},$$

where F denotes a total count of content files, and a corresponding set of file sizes of the content files is $$\text{Size} = \{Z_1, Z_2, \ldots, Z_F\}.$$

MEC has characteristics such as low delay and local computing capability. The storage capacity refers to a maximum data amount that the MEC server may store. The caching state refers to a caching state of the cached content in the MEC server. In some embodiments, the caching state may be represented by a binary value. For example, when the caching state $st_f$=1, it indicates that a cached content f is currently stored in a cache space of the MEC server; when the caching state $st_f$=0, it indicates that the cached content is not stored in the cache space of the MEC server. The content file refers to a data unit that is stored in the remote server and may be requested by the user, and a file size of the content file may be represented by a count of occupied bytes.

In some embodiments, the user sends a content request to the base station, and the base station checks whether the edge server caches a requested content corresponding to the content request; if the edge server caches the requested content corresponding to the content request, the requested content is returned to the user; or if the edge server does not cache the requested content corresponding to the content request, the base station sends the content request to the core network.

The content request refers to an instruction initiated by the user for obtaining the requested content. The requested content refers to a content corresponding to the content request.

In some embodiments, the user may send the content request to the base station through the wireless link, and the base station may check whether the edge server caches the requested content based on a query protocol (for example, a DNS-based protocol).

S2, obtaining a caching state of the mobile edge computing (MEC) server in the system network model, and calculating a total delay for a single user to obtain a cached content based on the caching state of the MEC server.

Calculating the total delay for the single user to obtain the cached content includes: defining a transmission delay and a computational delay for the single user to obtain the cached content based on the caching state of the cached content in the MEC server, respectively. The total delay for the single user to obtain the cached content is obtained based on the transmission delay and the computational delay for the single user to obtain the cached content.

The transmission delay refers to a time elapsed from when the user sends the content request to when the requested content is received. The computational delay refers to a data processing time required by the edge server to respond to the content request of user.

In some embodiments, the processor calculates the transmission delay for the user to obtain the cached content based on the following manner.

When $st_f=1$, the transmission delay for the user q to receive the cached content f is:

$$\text{time}_{1\_trans,q,f} = \frac{Z_f}{R_{base,q}},$$

where $R_{base,q}$ denotes a transmission rate of a wireless link, in Mbps, and $Z_f$ denotes a size of the cached content f obtained by the user q, in MB.

$$R_{base,q} = \text{Band}_q \log_2\left(1 + \frac{\hat{P}_{base,q}\hat{G}_{base,q}}{N\,\text{Band}_q}\right),$$

where $\hat{P}_{base,q}$ denotes a transmission power of the base station, in W; $\hat{G}_{base,q}$ denotes a channel gain, dimensionless; N denotes a noise power spectral density, in W/Hz, and $\text{Band}_q$ denotes a communication bandwidth allocated to the user q by the system network model, in Hz.

When $st_f=0$, the transmission delay for the user q to obtain the cached content f is:

$$\text{time}_{2\_trans,q,f} = \frac{Z_f}{R_{base,q}} + \frac{Z_f}{r_f},$$

where $r_f$ denotes a backhaul link rate of the cached content f, in Mbps. In some embodiments, the backhaul link rate is determined based on optical fiber transmission characteristics. For example, the stronger the optical fiber transmission capability is, that is, the lower the loss, the higher the bandwidth, and the stronger the anti-interference capability, the higher the backhaul link rate is.

The transmission delay $\text{time}_{trans,q,f}$ for the user q to obtain the cached content f is:

$$\text{time}_{trans,q,f} = st_f \cdot \text{time}_{1\_trans,q,f} + (1 - st_f) \cdot \text{time}_{2\_trans,q,f} = (1 - st_f)\frac{Z_f}{R_{base,q}} + \frac{Z_f}{\text{Band}_q}.$$

In some embodiments, the processor calculates the computational delay for the user q to obtain the cached content f based on the following content.

When $st_f=1$, the computational delay for the user q to obtain the cached content f is:

$$\text{time}_{1\_computing,q,f} = \frac{Z_f}{freq_f^{base}},$$

where $Z_f$ denotes the size of the cached content f, in MB;

$$freq_f^{base}$$

denotes a count of cycles executed per second (i.e., a cycle frequency) by a central processing unit (CPU) at the base station, in GHz.

When $st_f=0$, the computational delay for the user q to obtain the cached content f is:

$$\text{time}_{2\_computing,q,f} = \frac{Z_f}{freq_f^{core}},$$

where $$freq_f^{core}$$

denotes a count of cycles executed per second by a cloud CPU, in GHz.

The computational delay $\text{time}_{computing,q,f}$ for the user q to obtain the cached content f is:

$$\text{time}_{computing,q,f} = st_f \cdot \text{time}_{1\_computing,q,f} + (1 - st_f) \cdot \text{time}_{2\_computing,q,f},$$

Further, combining the transmission delay and the computational delay, the total delay $\text{time}_{q,f}$ for the user q to obtain the cached content f may be obtained as:

$$\text{time}_{q,f} = \text{time}_{trans,q,f} + \text{time}_{computing,q,f}.$$

S3, calculating a total delay for all users to obtain cached contents based on the total delay of the single user for the cached content.

Within a certain time interval $\tau$, a set of content requests sent by the user q is $Request_q$. Therefore, within the time interval $\tau$, based on the total delay for the single user to obtain the cached content, the total delay for all the users to obtain the cached contents may be calculated as:

$$time_{all} = \sum_{q \in Q} \sum_{f \in Request_q} time_{q,f},$$

where the time interval $\tau$ is dynamically adjusted according to a network load.

S4, constructing an optimization objective function based on the total delay for all the users to obtain the cached contents.

In some embodiments, with a goal of minimizing an average delay for obtaining the cached contents (also referred to as average content acquisition delay), the processor may construct the optimization objective function as shown below:

$$\min_{st_f} \frac{time_{all}}{Q\widetilde{req}},$$

$$\text{st. } \psi(1): \sum_{f=1}^{F} Z_f st_f \le Cap_{MEC}, \forall f \in \text{File},$$

$$\psi(2): st_f \in \{0, 1\}, \forall f \in \text{File},$$

where Q denotes a total count of all the users, $\widetilde{req}$ denotes a count of content requests by the single user within the time interval $\tau$; a constraint condition $\psi(1)$ means that a total volume of cached contents in the MEC server does not exceed a storage capacity; a constraint condition $\psi(2)$ is a constraint of the caching state of the cached content; F denotes the total count of the cached contents obtained by all the user, that is, the total count of content files; $Z_f$ denotes the size of the cached content f obtained by the single user; $st_f$ denotes the caching state of the cached content f; $Cap_{MEC}$ denotes the storage capacity of the MEC server; and File denotes the set of all content files.

S5, formulating a Markov decision process (MDP) according to the optimization objective function.

In some embodiments, the processor models a dynamic content replacement problem as a Markov decision process (MDP), which specifically includes the following Steps 1-5. The MDP is usually defined by factors such as <Ŝ,Â,P̂,R̂,>. For definitions and descriptions of Ŝ,Â,P̂,R̂, refer to the following contents.

Step 1, defining a system state space Ŝ.

In each time slot, the base station provides information about a cache placement state and a content request state, and the cache placement state and the content request state are designated as the system state space. The time slot refers to a continuous period of time. Each time slot may include a plurality of time points. The cache placement state refers to a set of contents actually cached in the MEC server in a certain time slot, and the content request state refers to a set of content requests from the user received by the base station in a certain time slot, and expressions thereof are as follows:

$$\hat{C}^{\hat{t}} = \left\{\hat{C}_1^{\hat{t}}, \hat{C}_2^{\hat{t}}, \ldots, \hat{C}_{NUM1}^{\hat{t}}\right\},$$

where $\hat{C}^{\hat{t}}$ denotes a set of contents cached by the base station at a time point $\hat{t}$.

$$\hat{L}^{\hat{t}} = \left\{\hat{l}_1^{\hat{t}}, \hat{l}_2^{\hat{t}}, \ldots, \hat{l}_{NUM2}^{\hat{t}}\right\},$$

where $\hat{L}^{\hat{t}}$ denotes a set of content requests received by the base station at the time point $\hat{t}$.

Therefore, a state at the time point $\hat{t}$ may be expressed as $$\hat{s}_{\hat{t}} = \left\{\hat{C}^{\hat{t}}, \hat{L}^{\hat{t}}\right\},$$

and the system state space Ŝ may be expressed as $$\hat{S} = \{\hat{s}_{\hat{1}}, \hat{s}_{\hat{2}}, \ldots, \hat{s}_{\hat{N}}\},$$

where N denotes a count of time points included in each time slot.

Step 2, defining a system action space.

When the base station receives the content request from the user, the base station needs to determine whether to perform caching and which cached content to replace. Therefore, the system action space is expressed as follows:

$$\hat{A} = \left\{a^0, a^1, \ldots, a^{\hat{V}}\right\},$$

where $a^0$ denotes an action; when $$a_{\hat{t}} = a^0$$

indicates that a current request content is not cached; when $$a_{\hat{t}} = a^{\hat{v}}(1 \le \hat{v} \le \hat{V})$$

indicates that the current request content is cached and replaces a $\hat{v}$-th content in the cache space; $\hat{V}$ denotes a total count of request contents in the cache space that are available for replacement by the current request content which is cached.

Step 3, determining a state transition probability matrix of the system network model.

According to a probability of reaching a next state based on a current state and an action, the state transition probability matrix of the system network model is expressed as follows:

$$\hat{P}(\hat{s}_{\hat{t}+1} \mid \hat{s}_{\hat{t}}, \hat{a}_{\hat{t}}).\ \hat{s}_{\hat{t}}$$

denotes a state at the time point $\hat{t}$, and $$\hat{s}_{\hat{t}+1}$$

denotes a state at a time point $\hat{t}+1$. In some embodiments, the state transition probability matrix is determined by environment characteristics.

Step 4, constructing a reward function of the system network model.

An immediate reward obtained after performing an action may be expressed as follows:

$$R(\hat{s}_{\hat{t}}, \hat{a}_{\hat{t}}) = G - \frac{\text{time}_{all}}{Q\widehat{req}},$$

where, to ensure that the immediate reward is positive, G is a positive integer greater than an average content acquisition delay.

Step 5, evaluating a policy based on a state value function and a state-action value function.

In the MDP, a policy is generally evaluated through a state value function and a state-action value function. The state value function is defined as:

$$\hat{V}^{\pi}(\hat{s}) = E_{\pi}\left[\hat{R}_{\hat{t}} \,\middle|\, \hat{s}_{\hat{t}} = \hat{s}\right],$$

where $\hat{V}^{\pi}(\hat{s})$ denotes a state value function under a policy $\pi$, $E_{\pi}$ denotes an expectation of the policy $\pi$, $$\hat{R}_{\hat{t}}$$

denotes a cumulative reward, and $$\hat{s}_{\hat{t}} = \hat{s}$$

denotes assigning a state $$\hat{s} \text{ to } \hat{s}_{\hat{t}}.$$

The state value function is used to describe an expected long-term return that an agent may obtain when starting from the state $\hat{s}$, following the policy $\pi$ to select actions (considering the expectation over all possible executable actions), and transitioning through subsequent states until reaching the terminal state.

The state-action value function is defined as:

$$\hat{Q}^{\pi}(\hat{s}, \hat{a}) = E_{\pi}\left[\hat{R}_{\hat{t}} \,\middle|\, \hat{s}_{\hat{t}} = \hat{s}, \hat{a}_{\hat{t}} = \hat{a}\right],$$

where $$\hat{a}_{\hat{t}} = \hat{a}$$

denotes assigning an action $$\hat{a} \text{ to } \hat{a}_{\hat{t}}.$$

The state-action value function (also referred to as an action-value function or a Q-function) is used to describe an expected long-term return that an agent may obtain when starting from the state $\hat{s}$, following the policy $\pi$ to select the actions $\hat{a}$, and transitioning through subsequent states until reaching the terminal state.

A purpose of the MDP is to find an optimal policy for a decision-maker to maximize a cumulative reward. The policy is expressed as $$\pi = \pi(\hat{a}_{\hat{t}} | \hat{s}_{\hat{t}}), \text{ where } \pi(\hat{a}_{\hat{t}} | \hat{s}_{\hat{t}})$$

refers to a probability of taking the action $$\hat{a}_{\hat{t}}$$

according to the state $$\hat{s}_{\hat{t}}.$$

Therefore, a process performed by the base station at the time point $\hat{t}$ is as follows:

(1) taking the time point $\hat{t}$ as a starting point, the base station observing a current state as $$\hat{s}_{\hat{t}} \in \hat{S}.$$

(2) performing, by the base station, the action $$\hat{a}_{\hat{t}}$$

based on the policy $\pi$.

(3) obtaining the cumulative reward $$\hat{R}_{\hat{t}}$$

by the system network model based on $$\hat{R}(\hat{s}_{\hat{t}}, \hat{a}_{\hat{t}}) \text{ and } \hat{P}(\hat{s}_{\hat{t}+1} \mid \hat{s}_{\hat{t}}, \hat{a}_{\hat{t}}),$$

and updating the current state to $$\hat{s}_{\hat{t}+1}.$$

(4) feeding back the cumulative reward to the base station by the system network model, proceeding to a time point $\hat{t}+1$, and then repeating the operations (1)-(3).

The cumulative reward $$\hat{R}_{\hat{t}} = \sum_{\hat{k}=0}^{\infty} \eta^{\hat{k}} \hat{R}(\hat{s}_{\hat{t}+\hat{k}}, \hat{a}_{\hat{t}+\hat{k}}),$$

$\eta \in [0,1]$, where $\hat{k}$ denotes a variable in a cumulative summation formula, taking a value from 0 to infinity; a discount factor $\eta$ may indicate whether $$\hat{R}_{\hat{t}}$$

prioritizes the immediate reward or the cumulative reward, and a larger $\eta$ indicates more emphasis on the cumulative reward. By finding an optimal caching policy $\pi^*$, an expected cumulative reward is maximized, that is:

$$\pi^* = \underset{\pi}{\operatorname{argmax}} E(\hat{R}_{\hat{t}} \mid \pi).$$

In some embodiments, the processor may recursively solve for the optimal caching policy through a Bellman equation by means of value iteration or policy iteration. In some embodiments, the processor may also use a model-free Monte Carlo manner to obtain the optimal caching policy by calculating a policy gradient.

S6, replacing the cached content of the MEC server using the dynamic content replacement algorithm based on deep reinforcement learning according to the Markov decision process.

In some embodiments, the processor may replace the cached content of the MEC server based on an Actor-Critic algorithm. In some embodiments, since the action space for establishing the Markov decision process is discrete, the processor may formulate a cache replacement policy through an Asynchronous Advantage Actor-Critic (A3C) algorithm, and then replace the cached content of the MEC server. A network structure of the A3C algorithm is shown in FIG. 2. Different from a general Actor-Critic algorithm, during calculating the policy gradient, the A3C algorithm replaces a Q-value with an advantage function, where the Q-value is a value of the state-action value function, and a formula of the advantage function is as follows:

$$\hat{A}(\hat{s}, \hat{a}) = \hat{Q}(\hat{s}, \hat{a}) - \hat{V}(\hat{s}),$$

wherein $\hat{Q}(\hat{s},\hat{a})$ denotes the state-action value function, $\hat{V}(\hat{s})$ denotes the state value function.

Then, an unbiased estimate of the advantage function may be performed to obtain a loss function of an Actor network, and an expression of the loss function is as follows:

$$\widetilde{Loss}_{a} = \log \pi_\theta(\hat{s}_{\hat{t}}, \hat{a}_{\hat{t}}; \theta) \hat{A}^{\pi_\theta}(\hat{s}_{\hat{t}}, \hat{a}_{\hat{t}}; \theta_{\hat{c}}),$$

where $\theta$ is a parameter of the Actor network, $$\theta_{\hat{c}}$$

is a parameter of a Critic network, log is a logarithmic operation, $$\pi_\theta(\hat{s}_{\hat{t}}, \hat{a}_{\hat{t}}; \theta)$$

denotes a probability of taking an action output by a policy network, and $$\hat{A}^{\pi_\theta}(\hat{s}_{\hat{t}}, \hat{a}_{\hat{t}}; \theta_{\hat{c}})$$

is the advantage function.

A gradient of $\theta$ is updated as:

$$\theta \leftarrow \theta + \lambda \sum_{\hat{t}} (\nabla_\theta \log \pi_\theta(\hat{s}_t, \hat{a}_t; \theta) \hat{A}^{\pi_\theta}(\hat{s}_t, \hat{a}_t; \theta_{\hat{c}})),$$

where $\lambda$ denotes a learning rate;

$$\hat{A}^{\pi_\theta}(\hat{s}_{\hat{t}}, \hat{a}_{\hat{t}})$$

denotes the advantage function; $\nabla_\theta$ denotes a policy gradient.

The A3C algorithm incorporates an entropy term of the policy $\pi$ into the Actor network, with a coefficient of $\beta$. The gradient of $\theta$ is updated as:

$$\theta \leftarrow \theta + \lambda \sum_{\hat{t}} (\nabla_\theta \log \pi_\theta(\hat{s}_{\hat{t}}, \hat{a}_{\hat{t}}; \theta) \hat{A}^{\pi_\theta}(\hat{s}_{\hat{t}}, \hat{a}_{\hat{t}}; \theta_{\hat{c}})) + \beta \nabla_\theta H(\pi(\hat{s}_{\hat{t}}; \theta)),$$

where $$H(\pi(\hat{s}_{\hat{t}}; \theta))$$

denotes an entropy value of the policy $\pi$ corresponding to each time slot.

The Critic network evaluates an action of the Actor network by adjusting the Q-value. Since the advantage function in the Actor network only has the state value function $\hat{V}(s)$, only $\hat{V}(s)$ needs to be fitted. The present disclosure evaluates the Critic network through a mean square error loss function, where the mean square error loss function is:

$$\widetilde{Loss}_{c}(\hat{t}) = \sum_{\hat{t}} [\hat{R}_{\hat{t}} + \eta \hat{V}^{\pi_\theta}(\hat{s}_{\hat{t}+1}; \theta_{\hat{c}}) - \hat{V}^{\pi_\theta}(\hat{s}_{\hat{t}}; \theta_{\hat{c}})]^2.$$

An update manner of $$\theta_{\hat{c}}$$

is as follows:

$$\theta_{\hat{c}} \leftarrow \theta_{\hat{c}} + \lambda_{\hat{c}} \nabla_{\theta_{\hat{c}}} \hat{L}(\hat{t}) = \theta_{\hat{c}} + \lambda_{\hat{c}} \sum_{\hat{t}} \left[ \hat{R}_{\hat{t}} + \eta \hat{V}^{\pi_\theta}(\hat{s}_{\hat{t}+1}; \theta_{\hat{c}}) - \hat{V}^{\pi_\theta}(\hat{s}_{\hat{t}}; \theta_{\hat{c}}) \right]^2,$$

wherein $\lambda_{\hat{c}}$ denotes a learning rate of the Critic network, $\nabla_{\theta_{\hat{c}}}$ denotes a gradient of $\theta_{\hat{c}}$, and $\hat{L}(\hat{t})$ denotes a set of content requests received by the base station at the time point $\hat{t}$, that is, $\hat{L}^{\hat{t}}$.

Following embodiments are performed on a real dataset Movielens 1M. The dataset Movielens 1M records ratings of 3900 movies by 6040 users.

Parameter settings of a network of the A3C algorithm are as follows. A learning rate $\lambda$ of the Actor network and a learning rate $\lambda_{\hat{c}}$ of the Critic network are 0.0001 and 0.001, respectively. A count of neurons in a hidden layer of the Actor network and a count of neurons in a hidden layer of the Critic network are 256 and 256, respectively. The discount factor $\eta$ is 0.99, and the entropy factor $\lambda$ is 0.1.

Experimental simulation parameter settings are as follows. The noise power spectral density N is-174 dBm/Hz, the storage capacity $Cap_{MEC}$ of the MEC sever is 100 MB. The bandwidth Band of the base station, the CPU cycle frequency at the base station, the cloud CPU cycle frequency and the transmission power $\hat{P}_{base,q}$ are set to 10 MHz, 16 GHZ, 16 GHZ, and 20 W, respectively. A CPU cycle frequency of the core network is set to 64 GHZ, the channel gain $\hat{G}_{base,q}$ is set to $30.6 + 36.7\log_{10} d_{MEC,u}$, where $d_{MEC,u}$ denotes a distance between the MEC sever and the user, and the backhaul link rate $r_f$ between the core network and the base station is set to 10 MB/s.

In an experiment, the method of the present disclosure is compared with a plurality of traditional prediction manners. The traditional prediction manners for comparison are an LRU algorithm, an LFU algorithm, and a FIFO algorithm:

(1) LRU (Least Recently Used) algorithm: when the storage capacity of the MEC server is full, a cached content with a longest time interval from a last request will be replaced.

(2) LFU (Least Frequently Used) algorithm: when the storage capacity of the MEC server is full, a cached content with a lowest user request frequency will be replaced.

(3) FIFO (First In First Out) algorithm: when the storage capacity of the MEC server is full, a cached content that has been cached for the longest time will be replaced.

Figure 3:
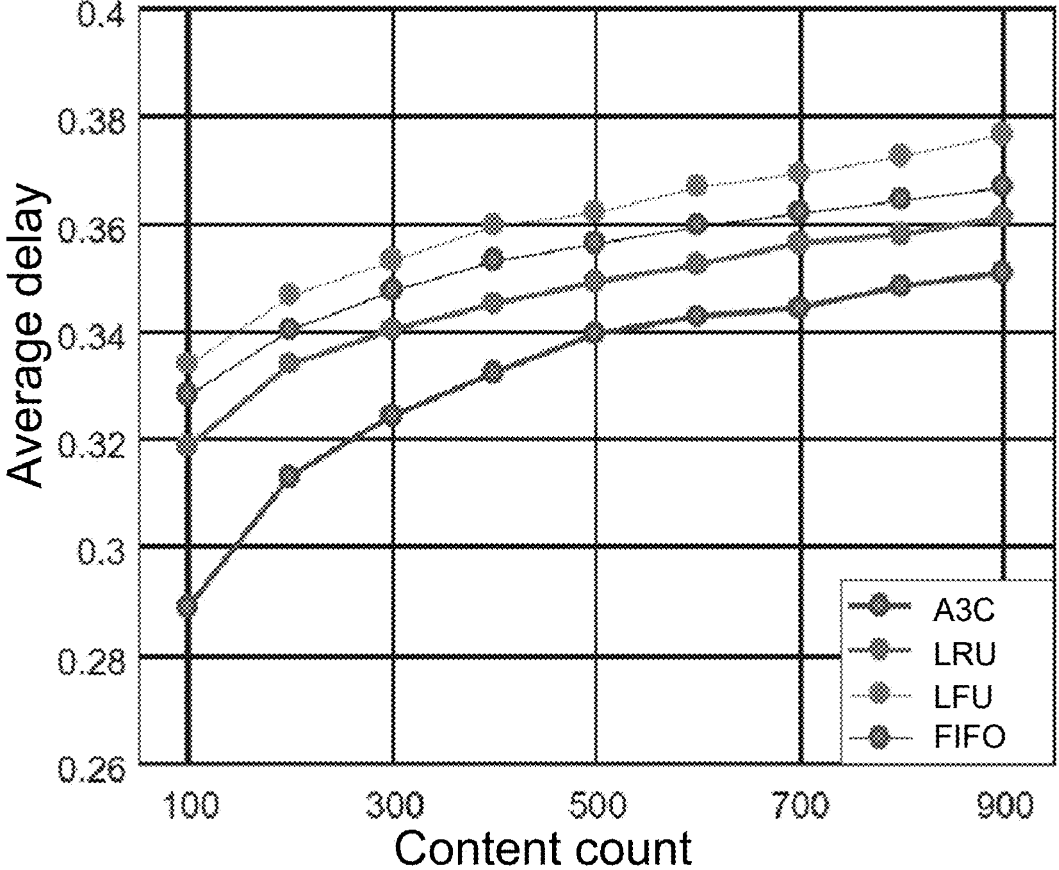
FIG. 3 is a comparative simulation diagram illustrating a change in average delay of different algorithms with different content counts according to some embodiments of the present disclosure.

FIG. 3 is a comparative simulation diagram illustrating a change in average delay of different algorithms with different content counts according to some embodiments of the present disclosure. As shown in FIG. 3, a horizontal coordinate represents a content count, and a vertical coordinate represents an average delay. It may be found from FIG. 3 that an average delay of a cache hit of each of the four algorithms increases as a count of content files continuously increases. This is because the storage capacity of the edge server is limited. As the count of content files increases, a probability that a content requested by the user is not in the MEC server increases, and more time is required to obtain the content from the core network.

It may be seen from the overall trend that the method for edge cache replacement of deep reinforcement learning provided by the present disclosure is superior to other three algorithms. With a same count of content files, an average transmission delay of the method provided by the present disclosure is the lowest, followed by the LRU algorithm, the FIFO algorithm, and the LFU algorithm. When the count of content files is 100, the average transmission delay of the method provided by the present disclosure is 0.03 s, 0.04 s, and 0.05 s lower than the average transmission delay of the LRU algorithm, the FIFO algorithm, and the LFU algorithm, respectively. Therefore, the method provided by the present disclosure has a better performance in delay than the other three algorithms.

Figure 4:
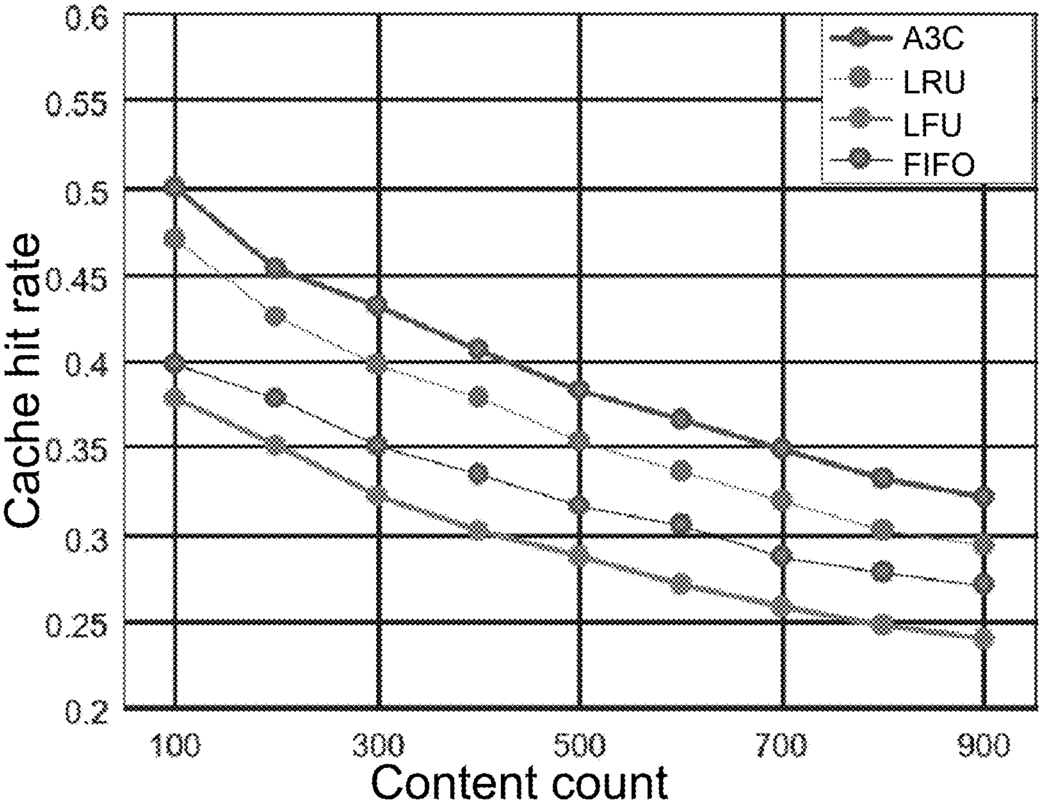
FIG. 4 is a comparative simulation diagram illustrating a change in cache hit rate of different algorithms with different content counts according to some embodiments of the present disclosure.

FIG. 4 is a comparative simulation diagram illustrating a change in cache hit rate of different algorithms with different content counts according to some embodiments of the present disclosure. As shown in FIG. 4, a horizontal coordinate represents a content count, and a vertical coordinate represents a cache hit rate. The cache hit rate refers to a probability that a content requested by the user is cached in the MEC server. It may be found from FIG. 4 that as a count of content files continuously increases, cache hit rates of four algorithms are all continuously reduced. This is because the storage capacity of the edge server is limited. As the count of content files increases, the probability that a content requested by the user is not cached in the MEC server increases, and more time is required to obtain the content from the core network. It may be seen from the overall trend that the method provided by the present disclosure is superior to other three algorithms. With the same count of content files, the cache hit rate of the method provided by the present disclosure is the highest, followed by the LRU algorithm, the FIFO algorithm, and the LFU algorithm. When the count of content files is 100, the cache hit rate of the method provided by the present disclosure is 6%, 20%, and 24% higher than the cache hit rate of the LRU algorithm, the FIFO algorithm, and the LFU algorithm, respectively. Therefore, an optimization effect of the method provided by the present disclosure in the cache hit rate is better than that of the other three algorithms.

In summary, by adjusting different parameters, it is proved that an approximate global optimal solution may be obtained using a proposed dynamic content replacement algorithm based on deep reinforcement learning, and has the best performance in different scenarios. The method provided by the present disclosure has better optimization effects in average delay and cache hit rate than other three algorithms, so that the system network model may obtain a maximum reward and find a most suitable cache replacement policy, which effectively improves a cache efficiency.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for edge cache replacement based on deep reinforcement learning, comprising:

S1, constructing a system network model;

S2, obtaining a caching state of a mobile edge computing (MEC) server in the system network model, and calculating a total delay for a single user to obtain a cached content based on the caching state of the MEC server;

S3, calculating a total delay for all users to obtain cached contents based on the total delay for the single user to obtain the cached content;

S4, constructing an optimization objective function based on the total delay for all users to obtain the cached contents, the optimization objective function being as follows:

$$\min_{st_f} \frac{\text{time}_{all}}{Q\widehat{req}}$$

$$\text{st. } \psi(1)\text{: } \sum_{f=1}^{F} Z_f \text{st}_f \leq \text{Cap}_{MEC},\ \forall f \in \text{File}$$

$$\psi(2)\text{: } \text{st}_f \in \{0, 1\},\ \forall f \in \text{File}$$

wherein Q denotes a total count of all the users, $\widehat{req}$ denotes a count of content requests by the single user within a time interval τ; F denotes a total count of the cached contents obtained by all the users, $Z_f$ denotes a size of the cached content f obtained by the single user, $st_f$ denotes a caching state of the cached content f, $Cap_{MEC}$ denotes a storage capacity of the MEC server, File denotes a set of all content files, a constraint condition ψ(1) means that a total volume of cached contents in the MEC server does not exceed the storage capacity; and a constraint condition ψ(2) is a constraint of the caching state of the cached content f;

S5, formulating a Markov decision process (MDP) according to the optimization objective function; and S6, replacing a cached content in the MEC server using a dynamic content replacement algorithm based on deep reinforcement learning according to the Markov decision process.

2. The method according to claim 1, wherein the system network model includes: a core network, a base station, an edge server, a remote server, and a user; the user sends a content request to the base station, and the base station checks whether the edge server caches a requested content corresponding to the content request, if the edge server caches the requested content corresponding to the content request, the requested content is returned to the user; or if the edge server does not cache the requested content corresponding to the content request, the base station sends the content request to the core network.

3. The method according to claim 1, wherein calculating the total delay for the single user to obtain the cached content includes: calculating a transmission delay for the single user to obtain the cached content, and calculating a computational delay for the single user to obtain the cached content; and obtaining the total delay for the single user to obtain the cached content based on the transmission delay for the single user to obtain the cached content and the computational delay for the single user to obtain the cached content.

4. The method according to claim 3, wherein:

calculating the transmission delay for the single user to obtain the cached content includes:

when $st_f=1$, calculating the transmission delay for the single user to obtain the cached content as follows:

$$time_{1\_trans,q,f} = \frac{Z_f}{R_{base,q}}$$

wherein $R_{base,q}$ denotes a transmission rate of a wireless link;

$$R_{base,q} = Band_q \ \log_2\left(1 + \frac{\hat{P}_{base,q}\hat{G}_{base,q}}{N \ Band_q}\right)$$

wherein $\hat{P}_{base,q}$ denotes a transmission power of a base station; $\hat{G}_{base,q}$ denotes a channel gain; and N denotes a noise power spectral density;

when $st_f=0$, calculating the transmission delay for the single user to obtain the cached content as follows:

$$time_{2\_trans,q,f} = \frac{Z_f}{R_{base,q}} + \frac{Z_f}{r_f}$$

wherein $r_f$ denotes a backhaul link rate of the cached content f;

then the transmission delay $time_{trans,q,f}$ for the single user to obtain the cached content being as follows:

$$time_{trans,q,f} = st_f \cdot time_{1\_trans,q,f} + (1 - st_f) \cdot time_{2\_trans,q,f} = (1 - st_f)\frac{Z_f}{R_{base,q}} + \frac{Z_f}{Band_q};$$

calculating the computational delay for the single user to obtain the cached content includes:

when $st_f=1$, calculating the computational delay for the single user to obtain the cached content as follows:

$$time_{1\_computing,q,f} = \frac{Z_f}{freq_f^{base}}$$

wherein $$freq_f^{base}$$

denotes a count of cycles executed per second by a central processing unit (CPU) at the base station;

when $st_f=0$, calculating the computational delay for the single user to obtain the cached content as follows:

$$time_{2\_computing,q,f} = \frac{Z_f}{freq_f^{core}}$$

wherein $$freq_f^{core}$$

denotes a count of cycles executed per second by a cloud CPU;

then the computational delay $time_{computing,q,f}$ for the single user to obtain the cached content being as follows:

$$time_{computing,q,f} = st_f \cdot time_{1\_computing,q,f} + (1 - st_f) \cdot time_{2\_computing,q,f}.$$

5. The method according to claim 1, wherein the total delay for all the users to obtain the cached contents is calculated according to a following formula:

$$time_{all} = \sum_{q \in Q} \sum_{f \in Request_q} time_{q,f}$$

wherein q denotes the single user, Q denotes the total count of all the users, f denotes the cached content, and $time_{q,f}$ denotes a total delay for the single user q to obtain the cached content f.

6. The method according to claim 1, wherein formulating the Markov decision process (MDP) includes: defining a system state space, a system action space, and a system reward function; and constructing a state-action value function based on the system state space, the system action space, and the system reward function to evaluate a policy.

7. The method according to claim 6, wherein defining the system state space, the system action space, and the system reward function includes:

defining the system state space as follows: in each time slot, a base station provides information about a cache placement state and a content request state, and the cache placement state and the content request state are designated as a state space, which is expressed as follows:

$$\hat{C}^{\hat{t}} = \{\hat{C}_1^{\hat{t}}, \hat{C}_2^{\hat{t}}, \ldots, \hat{C}_{NUM1}^{\hat{t}}\}$$

$$\hat{L}^{\hat{t}} = \{\hat{l}_1^{\hat{t}}, \hat{l}_2^{\hat{t}}, \ldots, \hat{l}_{NUM2}^{\hat{t}}\}$$

$$\hat{s}_{\hat{t}} = \{\hat{C}^{\hat{t}}, \hat{L}^{\hat{t}}\}$$

wherein $$\hat{C}^{\hat{t}}$$

denotes a set of contents cached by the base station at a time point $\hat{t}$, $$\hat{L}^{\hat{t}}$$

denotes a set of content requests received by the base station at the time point $\hat{t}$, and $$\hat{S}_{\hat{t}}$$

denotes the state space of the base station at the time point $\hat{t}$;

defining the system action space as follows:

$$\hat{A} = \{a^0, a^1, \ldots, a^{\hat{V}}\}$$

wherein $a^0$ denotes an action;

$$a_{\hat{t}} = a^0$$

indicates that a current request content is not cached;

$$a_{\hat{t}} = a^{\hat{v}}(1 \le \hat{v} \le \hat{V})$$

indicates that the current request content is cached and replaces a $\hat{v}$-th content in a cache space; $\hat{V}$ denotes a total count of request contents in the cache space that are available for replacement by the current request content which is cached; and defining the system reward function as follows:

$$\hat{R}(\hat{s}_{\hat{t}}, \hat{a}_{\hat{t}}) = \hat{G} - \frac{time_{all}}{Q\widehat{req}}$$

wherein $\hat{G}$ denotes a positive integer greater than an average content acquisition delay, $$\hat{s}_{\hat{t}}$$

denotes a current state, $$\hat{a}_{\hat{t}}$$

denotes a current action, $time_{all}$ denotes the total delay for all the users to obtain the cached contents, Q denotes the total count of all the users, and $\widehat{req}$ denotes the count of the content requests by the single user in the time interval $\tau$.

8. The method according to claim 6, wherein constructing the state-action value function to evaluate the policy includes:

Step 1: taking a time point $\hat{t}$ as a starting point, a base station observing a current state as $$\hat{s}_{\hat{t}} \in \hat{S};$$

Step 2: performing, by the base station, an action $$\hat{a}_{\hat{t}}$$

based on a policy $\pi$,

Step 3: obtaining a cumulative reward $$\hat{R}_{\hat{t}}$$

by the system network model based on $$\hat{R}(\hat{s}_{\hat{t}}, \hat{a}_{\hat{t}}) \text{ and } \hat{P}(\hat{s}_{\hat{t}+1} \mid \hat{s}_{\hat{t}}, \hat{a}_{\hat{t}}),$$

and updating the current state $$\hat{s}_{\hat{t}} \text{ to } \hat{s}_{\hat{t}+1};$$

Step 4: feeding back the cumulative reward $$\hat{R}_{\hat{t}}$$

to the base station by the system network model, proceeding to a time point $\hat{t}+1$, and repeating Steps 1-3;

Step 5: determining a system cumulative reward and obtaining an optimal caching policy π* based on the system cumulative reward; and Step 6: evaluating the policy using a state-value function and the state-action value function.

9. The method according to claim 1, wherein the dynamic content replacement algorithm based on deep reinforcement learning is composed of an environment, a plurality of agents, and a global network, wherein the global network includes a system state, an Actor network, and a Critic network, and the plurality of agents and the global network have a same network structure; and replacing the cached content of the MEC server using the dynamic content replacement algorithm based on deep reinforcement learning specifically includes:

S61, defining an advantage function as follows:

$$\hat{A}(\hat{s},\hat{a})=\hat{Q}(\hat{s},\hat{a})-\hat{V}(\hat{s})$$

wherein $\hat{Q}(\hat{s},\hat{a})$ denotes a state-action value function, $\hat{V}(\hat{s})$ denotes a state value function;

S62, calculating a policy gradient $\nabla_\theta J(\theta)$ according to the advantage function as follows:

$$\nabla_\theta J(\theta)=E\left[\hat{A}(\hat{s},\hat{a})\nabla_\theta \log\pi_\theta(\hat{s},\hat{a})\right]$$

wherein θ denotes a parameter of a neural network, $\pi_\theta(\hat{s},\hat{a})$ denotes a probability of taking an action $$a_{\hat{t}}$$

according to a state $$\hat{s}_{\hat{t}},$$

Â denotes a system action space, and E denotes taking an expected value;

S63, performing an unbiased estimate of the advantage function according to the policy gradient to obtain a loss function of the Actor network as follows:

$$\widehat{Loss}_a=\log\pi_\theta(\hat{s}_{\hat{t}},\hat{a}_{\hat{t}};\theta)\hat{A}^{\pi_\theta}(\hat{s}_{\hat{t}},\hat{a}_{\hat{t}};\theta_{\hat{c}})$$

S64, updating a gradient of θ according to the loss function of the Actor network as follows:

$$\theta\leftarrow\theta+\lambda\sum_{\hat{t}}\left(\nabla_\theta\log\pi_\theta(\hat{s}_{\hat{t}},\hat{a}_{\hat{t}};\theta)\hat{A}^{\pi_\theta}(\hat{s}_{\hat{t}},\hat{a}_{\hat{t}};\theta_{\hat{c}})\right)$$

wherein λ denotes a learning rate;

$$\hat{A}^{\pi_\theta}(\hat{s}_{\hat{t}},\hat{a}_{\hat{t}})$$

denotes the advantage function;

S65, optimizing the gradient of θ according to a policy π as follows:

$$\theta\leftarrow\theta+\lambda\sum_{\hat{t}}\left(\nabla_\theta\log\pi_\theta(\hat{s}_{\hat{t}},\hat{a}_{\hat{t}};\theta)\hat{A}^{\pi_\theta}(\hat{s}_{\hat{t}},\hat{a}_{\hat{t}};\theta_{\hat{c}})\right)+\beta\nabla_\theta H(\pi(\hat{s}_{\hat{t}};\theta))$$

wherein $$H(\pi(\hat{s}_{\hat{t}};\theta))$$

denotes an entropy value of the policy π corresponding to each time slot, and β denotes a coefficient;

S66, evaluating an action of the Actor network by adjusting a Q-value by the Critic network; calculating a mean square error loss function based on the optimized parameter θ, and evaluating the Critic network using the mean square error loss function, where the mean square error loss function is:

$$\widehat{Loss}_c(\hat{t})=\sum_{\hat{t}}\left[\hat{R}_{\hat{t}}+\eta\hat{V}^{\pi_\theta}(\hat{s}_{\hat{t}+1};\theta_{\hat{c}})-\hat{V}^{\pi_\theta}(\hat{s}_{\hat{t}};\theta_{\hat{c}})\right]^2$$

wherein $$\hat{R}_{\hat{t}}$$

denotes a cumulative reward, η denotes a discount factor, and $$\hat{V}^{\pi_\theta}(\hat{s}_{\hat{t}+1};\theta_{\hat{c}})$$

denotes a state value function at a time point $\hat{t}+1$;

S67, updating a gradient of a parameter $$\theta_{\hat{c}}$$

in the Critic network according to the mean square error loss function as follows:

$$\theta_{\hat{c}}\leftarrow\theta_{\hat{c}}+\lambda_{\hat{c}}\nabla_{\theta_{\hat{c}}}\hat{L}(\hat{t})=\theta_{\hat{c}}+\lambda_{\hat{c}}\sum_{\hat{t}}\left[\hat{R}_{\hat{t}}+\eta\hat{V}^{\pi_\theta}(\hat{s}_{\hat{t}+1};\theta_{\hat{c}})-\hat{V}^{\pi_\theta}(\hat{s}_{\hat{t}};\theta_{\hat{c}})\right]^2$$

wherein $$\lambda_{\hat{c}}$$

denotes a learning rate of the Critic network; and

S68, replacing the cached content of the MEC server according to an optimized dynamic content replacement algorithm.

* * * * *